United States Patent
Baumann et al.

(10) Patent No.: US 7,052,569 B2
(45) Date of Patent: May 30, 2006

(54) METHOD FOR PRODUCING A HIGH-QUALITY INSULATION OF ELECTRIC CONDUCTORS OR CONDUCTOR BUNDLES OF ROTATING ELECTRICAL MACHINES BY MEANS OF SPRAY SINTERING

(75) Inventors: Thomas Baumann, Wettingen (CH); Johann Nienburg, Heidelberg (DE); Jörg Sopka, Schwetzingen (DE)

(73) Assignee: ALSTOM Technology Ltd., Baden (CH)

( * ) Notice: Subject to any disclaimer, the term of this patent is extended or adjusted under 35 U.S.C. 154(b) by 202 days.

(21) Appl. No.: 10/168,174

(22) PCT Filed: Dec. 21, 2000

(86) PCT No.: PCT/CH00/00680

§ 371 (c)(1),
(2), (4) Date: Nov. 12, 2002

(87) PCT Pub. No.: WO01/48895

PCT Pub. Date: Jul. 5, 2001

(65) Prior Publication Data

US 2003/0113441 A1 Jun. 19, 2003

(30) Foreign Application Priority Data

Dec. 28, 1999 (DE) ................................ 199 63 491

(51) Int. Cl.
*B05D 1/06* (2006.01)
(52) U.S. Cl. ................. 156/272.2; 156/273.1; 156/274.2; 156/275.5; 156/279; 156/307.1; 427/116; 427/180; 427/183; 427/203; 427/402; 427/405; 427/410; 427/421

(58) Field of Classification Search ............. 156/272.2, 156/273.1, 274.2, 279, 275.5, 307.1, 308.2, 156/309.9; 427/180, 182, 183, 203, 116, 427/402, 405, 410, 421
See application file for complete search history.

(56) References Cited

U.S. PATENT DOCUMENTS 2,808,343 A * 10/1957 Simmons ..................... 427/477

(Continued)

FOREIGN PATENT DOCUMENTS

DE 3936431 C1 1/1991

(Continued)

OTHER PUBLICATIONS

Patent Abstracts of Japan, vol. 1999, No. 03, Mar. 31, 1999, JP 10 314658 A (Sankyo Seiki Mfg Co Ltd), Dec. 2, 1998, Zusammenfassung.

(Continued)

*Primary Examiner*—Sam Chuan Yao
(74) *Attorney, Agent, or Firm*—Cermak & Kenealy,LLP; Adam J. Cermak (57) ABSTRACT

The present invention discloses a process for producing a high-quality insulation for conductors or conductor bundles of electrical machines by means of spray-sintering. Unlike in the prior art, it is possible to apply internal corona-discharge protection, insulation and external corona-discharge protection to conductors or conductor bundles in which, on account of a very low level of defects in the insulation and its inherent resistance to partial discharges, it is possible to dispense with the use of winding processes using glass/mica tapes. This eliminates the need to use complex special equipment and allows the throughput times to be shortened considerably.

24 Claims, 3 Drawing Sheets

U.S. PATENT DOCUMENTS

| | | | |
|---|---|---|---|
| 3,747,853 A | 7/1973 | Kipple et al. | |
| 4,114,564 A * | 9/1978 | Probst | 118/626 |
| 4,760,296 A | 7/1988 | Johnston et al. | |
| 5,316,801 A | 5/1994 | Hopeck | |
| 5,636,798 A * | 6/1997 | Buschor | 239/696 |
| 5,650,031 A | 7/1997 | Bolon et al. | |
| 6,156,392 A * | 12/2000 | Duffy et al. | 427/475 |

FOREIGN PATENT DOCUMENTS

| | | |
|---|---|---|
| DE | 3933745 A1 | 4/1991 |
| DE | 4027892 A1 | 4/1991 |
| DE | 4037972 A1 | 6/1991 |
| DE | 19701307 A1 | 7/1998 |
| DE | 19706851 A1 | 9/1998 |
| DE | 19860412 A1 | 6/2000 |
| EP | 0321223 A | 6/1989 |
| EP | 0660336 A2 | 6/1995 |

OTHER PUBLICATIONS

Patent Abstracts of Japan, vol. 004, No. 121 (E-023), Aug. 27, 1980, & JP 55 074345 A (Nippon Denso Co Ltd), Jun. 4, 1980, Zusammenfassung.

Patent Abstracts of Japan, vol. 014, No. 045 (E-0880), Jan. 26, 1990) & JP 01 274648 A (Hitachi Ltd), Nov. 2, 1989, Zusammenfassung.

* cited by examiner

METHOD FOR PRODUCING A HIGH-QUALITY INSULATION OF ELECTRIC CONDUCTORS OR CONDUCTOR BUNDLES OF ROTATING ELECTRICAL MACHINES BY MEANS OF SPRAY SINTERING

TECHNICAL FIELD

The invention relates to the field of the insulation of rotating electrical machines. In particular, the invention relates to a process for producing a high-quality insulation for conductors or conductor bundles as are used in rotating machines, for example in the form of stator coils, transposed bars and excitation conductors.

PRIOR ART

Various processes are customarily used in the field of the insulation of conductors or conductor bundles of rotating electrical machines.

In one process, tapes comprising a glass-fiber support and mica paper are wound helically in layers onto a stator conductor until a desired insulation thickness is reached. Subsequent impregnation in epoxy resin displaces residual air from the insulating winding formed in this way, and the layers of tape are adhesively bonded. Curing in a suitable mold imparts the final shape to the insulation. For production reasons, in this process the mica platelets are oriented in the direction of the tape, which in the finished insulation results in the mica platelets being oriented parallel to the conductor surface. In the resin rich technique, epoxy resin in the B state is admixed with the tape and is consolidated by hot pressing of the bar.

According to a further process, which is known from EP 0 660 336 A2, tapes consisting of thermoplastic filled with mica are wound around the stator conductor. Consolidation and shaping in this case take place by means of hot pressing of the stator conductor around which the tape has been wound, during which process air is displaced, the thermoplastic is melted and the layers of the winding are adhesively bonded. In this process too, the mica platelets are oriented parallel to the conductor surface. However, the air is not completely expelled in any of the processes. Air-filled gaps and holes remain, in which, in the event of a voltage load, partial discharges in the nC range and above occur.

Finally, the stator conductor can also be insulated by extrusion of thermoplastics without fillers, i.e. also without mica, as described in U.S. Pat. No. 5,650,031.

Nowadays, however, the conductors of rotating electrical machines which are to be insulated are generally structures of a very complex shape, in the form of bars or coils. A straight part of the conductors is located in the grooves of the stator of the machine. A curved part of the conductors, after suitable connection to adjacent bars and coils, forms a winding head which projects out of the stator at both ends. In the case of large rotating machines, the length of the straight part may exceed 6 m. A problem hitherto has been that insulation and conductor usually have different coefficients of thermal expansion $\alpha$ which, over the course of time, on account of thermal stresses, may lead to defects in the insulation as a result of cavities which form where the insulation becomes detached, and that defects, for example inclusions of air, are formed during the production of the insulation. Partial discharges may occur at such defects, leading to damage to the insulation. In this case too, partial discharge activities in the 100 nC range are quite customary.

In view of these partial discharge activities, hitherto it has only been possible for the machine insulation to operate reliably as a result of the barrier action of mica platelets oriented perpendicular to the field direction. This prevents the formation of flashover passages leading out of the cavities. 2.5 to 2.75 kV/mm is generally regarded as the upper limit for long-term reliability of the operating field strength. However, a maximum level such as this is exceeded, in some cases considerably, by other insulation systems used in medium- or high-voltage insulation.

For example, the maximum field for long-term operation in pin-type insulators, in which an alumina-filled epoxy resin is used for gas-insulated circuits, is 4 kV/mm, and the maximum field for high-voltage cables, in which polyethylene is used, is approx. 12 kV/mm. A common feature of these conventional insulation systems is that there are no partial discharges under operating load.

However, since, moreover, the conventional processes and materials using mica which are currently in use are substantially already more than thirty years old, at best incremental improvements are to be expected from any further developments to this prior art. Therefore, it appears highly unlikely that it will be possible to further develop this prior art to develop a higher-quality insulation which can be produced with shorter throughput times and lower manufacturing costs compared to the prior art, and also in an environmentally friendly production process, i.e. without the use of solvents, without emissions and without the production of special waste, and which does not include any defects or, if there are defects, these defects do not lead to any partial discharges.

SUMMARY OF THE INVENTION

Therefore, it is an object of the present invention to provide a process for producing a high-quality insulation for conductors or conductor bundles in which the insulation has a high quality and can be produced with short throughput times, low manufacturing costs and in an environmentally friendly manner.

One aspect of the present invention includes a process for producing a high-quality insulation of conductors or conductor bundles.

This inventive process for producing a high-quality insulation for conductors or conductor bundles without cavities which may lead to partial discharges under test and operating loads means that the oriented mica platelets are no longer required. This greatly facilitates both the choice of production processes and the choice of materials for the insulation, since for many polymers it is difficult to incorporate mica in concentrations of more than 40% by weight.

BRIEF DESCRIPTION OF THE DRAWING

The invention is explained in more detail below with reference to a preferred exemplary embodiment which is illustrated in the drawing and in which.

EXEMPLARY EMBODIMENTS OF THE INVENTION

The following text provides an extensive description of a process for producing a high-quality insulation for conductors or conductor bundles of, for example, rotating electrical machines. First of all, the basic structure of the insulation will be dealt with, and then the process according to the invention will be explained in detail.

The insulation which is applied using the process according to the invention comprises three layers. The first layer forms an internal corona-discharge protection, consisting of conductively or semiconductively filled polymer. In this case, a polymer which can be successfully joined to the polymer material of the insulating layer which follows it is used. It is preferable to use the same polymer as in the insulating layer.

As is the case in high-voltage cables, the internal corona-discharge protection has the role of decoupling electrical and mechanical boundary layers. In electrical terms, the internal corona-discharge protection has the same potential as the metallic conductor below it, i.e. is part of the electrical conductor; in mechanical terms, by contrast, it is part of the insulation. This ensures that any points where the insulating sleeve and conductor become detached are free from partial discharges, since there is no voltage drop across the detachment.

The process according to the invention for the production of this high-quality insulation for conductors or conductor bundles is intended to satisfy the following demands:

1) The production process is to be substantially independent of the particular geometry of the initial bar or coil, i.e. of the transposed, uninsulated, consolidated bar or coil.
2) The insulation is to be of a high quality, i.e. compared to the prior art is to have an improved thermal stability up to approx. $T_{max}=180°$ C. and is to be able to withstand long-term operation at approx. 5 kV/mm on the flat sides of the conductors without being damaged.
3) Furthermore, the process is to allow production of an insulation of constant thickness with a tolerance $\Delta d/d<10\%$—even if the tolerances of the initial bar or coil are considerably greater—while it is to be possible to produce layer thicknesses of from 0.3 to 7 mm.
4) To shorten the production time, the throughput time per bar or coil is to be at most 1 to 2 hours.

In view of these demands which are to be satisfied by the process according to the invention, one could consider using conventional spray-sintering processes as the starting point.

A conventional spray-sintering process of this type is described, for example, in German patent DE 39 36 431, entitled "Process for applying a layer of plastic to a metallic conductor". In this conventional process, to apply a layer of plastic to a metallic conductor plastic powder is electrostatically charged, is deposited on the preheated metallic conductor and is then melted. The process is used to produce subconductor insulations, i.e. insulations with a low voltage load. This conventional spray-sintering process would require a significantly lower outlay on manufacturing technology than the conventional insulating process which involves winding a wide range of tapes around the conductor. This would make it possible to eliminate the use of expensive special equipment, such as for example winding robots, vacuum/pressure vessels, devices for the cooled storage of liquid resin. They would be replaced by commercially available coating units and commercially available robots.

It would also be possible for this conventional spray-sintering process to be automated to a far greater extent than the conventional process. The throughput times would be only 0.5 to 3 hours, instead of several days. The saving on investment costs would lead to the possibility of achieving both shorter throughput times and lower production costs.

However, it has proven to be a problem that the technique of spray-sintering or electrostatic spraying is currently generally only used for the dry painting of a very wide range of components, for example refrigerators, automobiles, garden furniture, etc., with very low layer thicknesses of approx. 80 µm. In the field of electrical engineering, this technique has hitherto only been used for the insulation of busbars in the medium- and high-voltage range. As has already been mentioned above, however, the insulation described above is only used to insulate subconductors in which there are only low potential differences.

In this conventional application in the field of insulation for busbars, however, unlike the high-quality insulation which is to be produced by the process according to the invention there is only a weak electrical load on the insulation, since the ground electrode is absent on the insulation, and therefore the voltage is for the most part reduced via the ambient air. Since, therefore, the electrical load is considerably lower, in the prior art the demands with regard to insulation thickness and freedom from defects are considerably lower than for the process according to the invention, and therefore defects are acceptable since there is no risk of partial discharges. It is customary to use a powder which is based on epoxy resin, but in the current composition this powder cannot be used at above $T=130°$, on account of high dielectric losses. Moreover, sample coatings using this powder have high levels of pores.

Therefore, compared to the known prior art of spray-sintering, the process according to the invention for the production of a high-quality insulation for conductors or conductor bundles requires numerous modifications in order to solve problems which have not hitherto been taken into account and to eliminate properties which are advantageous for this process in its conventional application but cause problems with a view to achieving the objectives of the invention.

Figure 1:
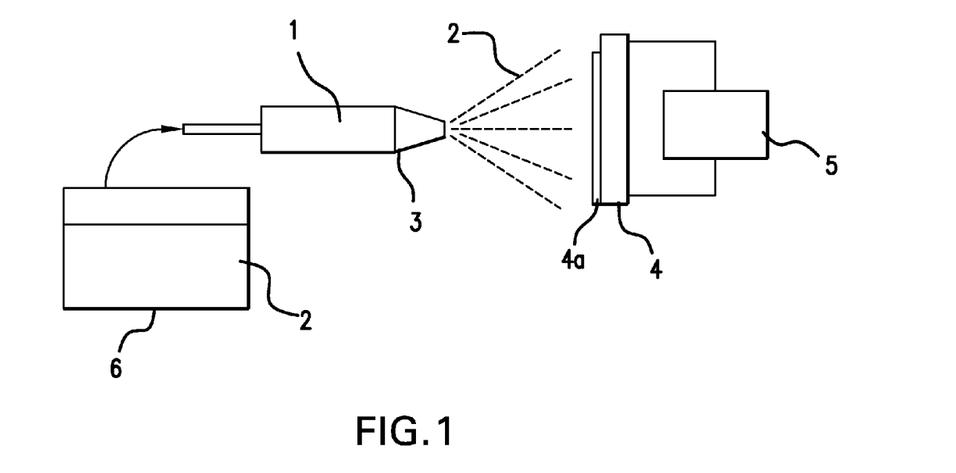
FIG. 1 shows a structure of the spray-sintering device according to the invention, and FIG. 2 (FIG. 2-1 and FIG. 2-2) shows a flow diagram which illustrates the way in which the process according to the invention is carried out.
Figure 21:
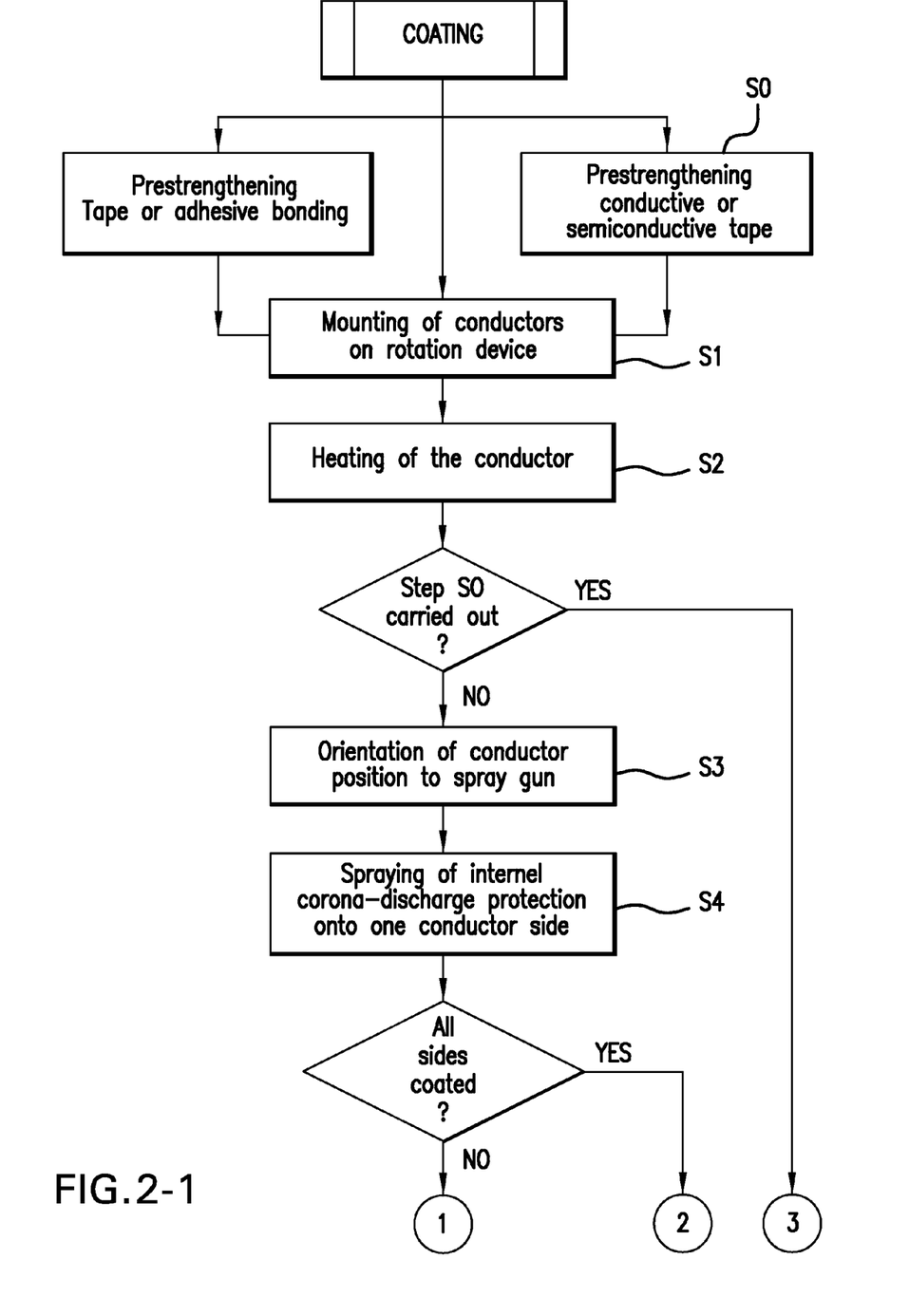
Figure 22:
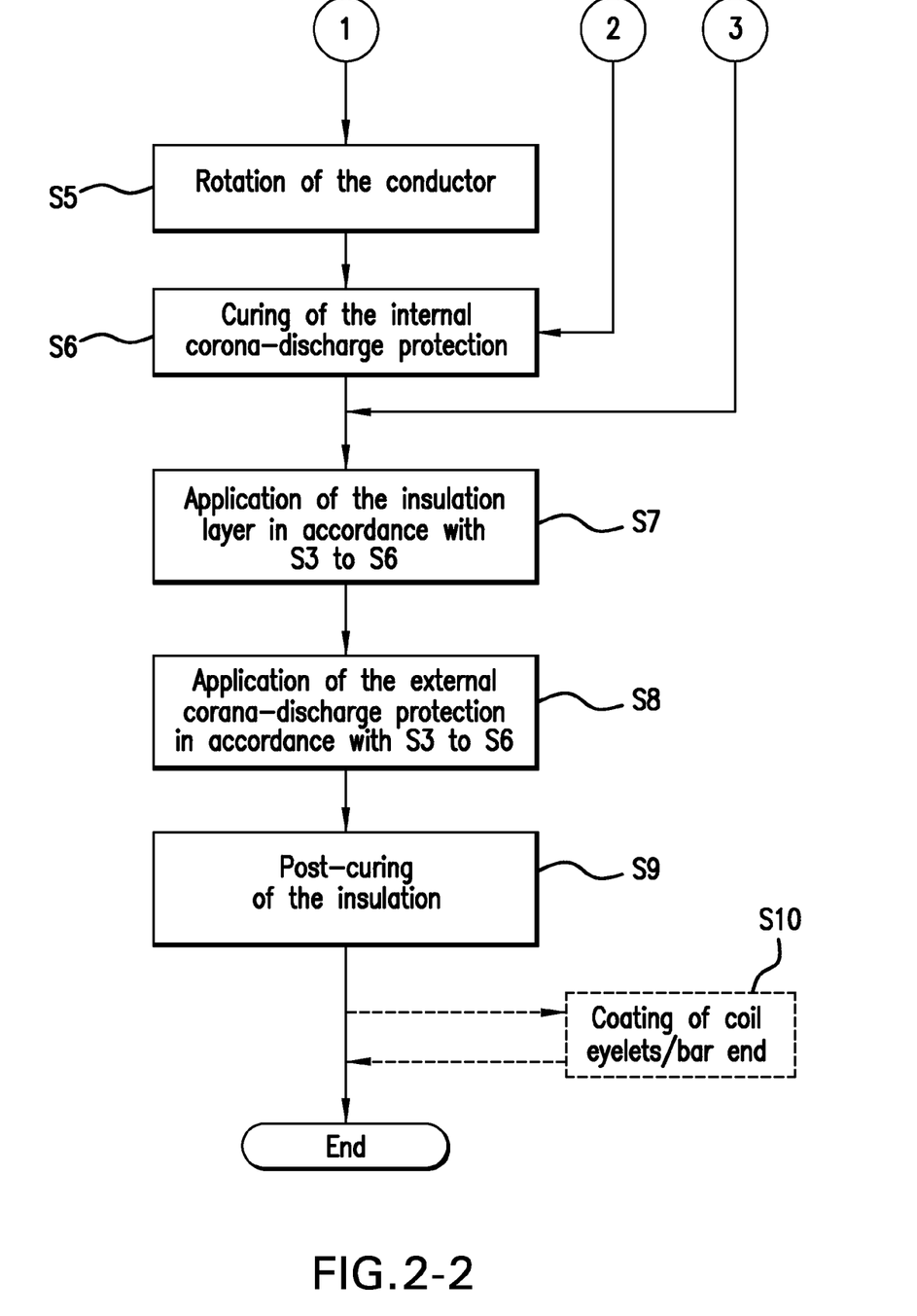

FIG. 1 diagrammatically depicts a device for carrying out the process according to the invention; for the sake of simplicity, some elements are not shown in FIG. 1 but rather are merely described in detail.

The central appliance for carrying out the process according to the invention is a spray gun 1. Coating material 2 in powder form, for example thermally crosslinking epoxy powder, is fed in fluidized form to this spray gun 1 from a reservoir 6. The fluidizing medium is in this case preferably dried air or nitrogen. The spray gun 1 may have a device 3 for electrostatically, i.e. negatively, or tribo-electrically, i.e. positively, charging the coating material 2, i.e. the powder particles.

However, it is not absolutely imperative for the coating material 2 to be electrically charged in the process according to the invention. Nevertheless, this charging has the advantage that greater amounts of material are applied at points and edges of a conductor which is to be insulated, on account of the local increase in the electric field. This can be influenced by adjusting the high voltage at the device 3. This is often desirable, since at these points the field strength is also higher in operation, and experience has shown that this is where voltage tends to break through the insulation.

In the process according to the invention, the spray gun 1 is moved past a heated substrate 4 which is to be coated, for example a conductor which is to be coated, at a constant distance, for example approx. 100 to 300 mm, a constant speed, for example approx. 50 to 800 mm/s, and with a constant delivery of powder, for example approx. 30 to 250 g/min. The spray gun 1 is preferably guided by means of an automatic displacement unit, e.g. a robot. The substrate is heated throughout the entire coating process. Since the present example relates to an electrical conductor, this can easily be achieved by electrical heating. Specifically, the substrate 4 can be heated either by resistance heating by means of direct current or low frequency, for example at 50 Hz, or by inductive heating by means of medium frequency or high frequency. For this purpose, by way of example a current source 5 is provided. The temperature of the substrate surface 4a which is to be coated is selected in such a way that the coating material 2, for example the epoxy powder, melts when it comes into contact with the surface and is then thermally crosslinked, i.e. cured.

In addition to the heating during coating which is described here, it is also conceivable to use methods in which the object to be coated is preheated (for example in a separate furnace), and is then transferred to the coating installation. On account of the high heat capacity of copper, it is now possible for the bar or coil to be coated with at least part of the total insulation thickness required. If the surface temperature drops to such an extent that the powder no longer melts to form a smooth film, but rather adheres in the form of a sand-like covering, it is necessary to supply further heat. The question of whether heating takes place continuously during coating or heating and coating cycles alternate makes no difference to the quality of the finished insulation. It is sensible to use the intermediate heating in a furnace if, in the case of objects with a very large Cu cross section, resistive heating or inductive heating are difficult to implement (on account of difficulties with introducing the current and contact resistance, or because HF sources in the 15 to 10 kA range are expensive and have to be shielded at high cost, respectively).

In an advantageous embodiment, the "furnace" comprises an assembly of IR radiators which is drawn or moved or fitted over the object mounted on the coating installation.

In the process according to the invention, the coating takes place in layers until the desired thickness of the insulation is reached, unlike in the prior art, in which the coating takes place in a single path. In this process, one layer corresponds to the insulating layer which is produced by means of one spray pass. In this case, after a spray pass, the coating material must be given sufficient time to melt, run and crosslink sufficiently for it no longer to be able to flow. Therefore, the gel time, which is to be explained in more detail below, is of considerable importance.

In principle, it is generally possible to build up layers with a thickness of 1 mm and more in one spray pass. However, tests have shown that for layer thicknesses of greater than 0.2 mm the number of bubbles, i.e. defects, in the insulation rises considerably, but hitherto these bubbles have not presented any problems in the application area of spray-sintering. The reason for the formation of bubbles at layer thicknesses of >0.2 mm is that adsorbed substances and impurities with a low vapor pressure are no longer able to evaporate out freely at high layer thicknesses. In conventional applications, this formation of bubbles caused few problems, but it does represent a drawback for the insulation according to the invention, and this drawback is to be avoided by the process according to the invention. Therefore, in the process according to the invention the insulation is applied in successive steps, in layer thicknesses of up to 0.2 mm, so that the desired freedom from defects can be achieved.

The constant spraying distance, spray-gun speed of movement and delivery of coating material and powder as explained above results in a thickness consistency of better than 0.08 mm for total thicknesses of approx. 1 mm. Since the rate can be changed very easily and in a very controlled way, the process according to the invention is able to locally vary the thickness of the insulation. For example, it is possible to increase the insulation thickness on the narrow sides of the transposed bar compared to the thicknesses on the wide sides, with the result that the electrical field strength is reduced without the groove width having to be increased or without the dissipation of heat from the bar, which takes place via the wide sides, being impeded.

Furthermore, with the process according to the invention it is also possible to reduce the insulating thickness in the bow region of transposed bars, where the electric field load is generally lower than in the straight part. An axial variation in the thickness or composition of conductive or semiconducting layers also leads to possibilities with regard to field dissipation which cannot be achieved or can only be achieved with difficulty using the conventional system.

If the thickness tolerance referred to above is insufficient or if a complicated layer distribution is desired, it is additionally possible to adapt the rate of movement of the spray gun, by contactless measurement of the current layer thickness at a given location x, y, z by means of infrared and by suitable feedback to the control system of the robot, in such a manner that the final thickness at the location x, y, z corresponds to the desired value.

In principle, all thermally crosslinkable plastics, known as thermosets, can be used as materials for the insulation. The requirement that the insulation be thermally suitable for use at up to 180° C. in the present application is best satisfied by epoxy materials. These materials consist of a mixture of at least one uncrosslinked resin and at least one hardener (as well as a few further additions, such as accelerators, pigments, etc.) and inorganic fillers. The mixture is solid up to at least 50° C. The melting and curing temperatures and the glass transition temperature $T_g$ vary according to the chemical composition of resin and hardener. The temperature profile of the mechanical and dielectric strength is closely linked to the glass transition temperature $T_g$. If it is desired for the insulation to be usable for thermal class H, $T_g$ should lie in this range, preferably between 150° C. and 200° C. Glass transition temperatures of significantly above 200° C. are, on the one hand, difficult to achieve and, on the other hand, lead to a material which is relatively brittle in the region of room temperature.

The abovementioned, desired freedom from bubbles is dependent not only on process parameters, such as the application thickness, but also on materials properties.

It is important that the epoxy in the liquid state has a sufficiently low viscosity to run and for the gel time to be long enough for all the bubble-forming impurities to have evaporated. This requirement for long gel times contradicts the conventional trend in powder coating where the spray-sintering technique has hitherto been used, namely that of deliberately establishing short gel times, for example typically of 15 s, by the addition of accelerators in order to achieve high throughput times during thin-film coating. However, by reducing the level of accelerator, it is possible without difficulty to achieve gel times for commercially available powders of ≧40 s, which is sufficiently long for the present application.

For spray powders, the viscosity is generally not measured and specified as a separate variable; rather, what is known as the run, resulting from the viscosity and gel time, is specified. Bubble-free layers are achieved if the run is >30 mm.

Filling with inorganic fillers is in principle desirable in order to reduce the price, improve the creep strength, reduce the coefficient of thermal expansion and improve the thermal conductivity of the insulation. The proportion of filler in the total mixture should amount to 5–50% by weight, based on a closed filler density of up to 4 g/cm$^3$. Examples of conventional fillers are silica flour, wollastonite, talc and chalk dust with grain sizes of around 10 µm (mean grain size $d_{50}$). To produce a spray powder, the filler is mixed and compounded with resin, hardener and further additives. The compounded product is then milled to form powder.

These milling processes are usually carried out in appliances made from steel or hard metal (Mohs hardness 5–6). The use of hard fillers, e.g. silica flour (hardness 7), leads to metallic abrasion, preferably in the form of chips in the sub-mm range. These are incorporated in the insulation and, on account of their acicular geometry, lead to locations where the electric field strength is locally very greatly increased, where experience has shown that an electrical breakdown can occur. The abrasion is avoided by using "soft" fillers (Mohs hardness$\leq$4), e.g. chalk dust, and/or by using relatively fine fillers with $d_{50}<<1$ µm, e.g. clay, $SiO_2$, ZnO or $TiO_2$.

Furthermore, fine fillers of this type have the advantage that, even if defects such as cavities or metallic inclusions are present, they prevent or at least very considerably delay electrical breakthroughs, as disclosed, for example, in U.S. Pat. No. 4,760,296, in the name of Johnston et al., or in German patent application DE 4037 972 A1. In these two publications, the effect of increasing the service life is achieved by completely or partially replacing the coarse filler with fillers which have grain sizes in the nanometer range (0.005 to 0.1 µm maximum grain size). However, nano fillers have the unacceptable additional property of greatly increasing the melt viscosity of the powder mixture, known as the thixotropy effect. This causes problems both during production of the powder and during processing thereof. Nevertheless, nano fillers represent a usable alternative for increasing the service life. However, for the application according to the invention it has also been found that the alternative of using $TiO_2$ powder with mean grain sizes of approx. 0.2 µm to completely or partially replace coarse fillers does not lead to a disadvantageous increase in the melt viscosity yet nevertheless does produce the effects of increasing service life in the same way as nano fillers. The proportion of $TiO_2$ powder in the total mixture should be at least 3%, preferably at least 5%.

Conductive layers which are used for internal corona-discharge protection and external corona-discharge protection can be produced by the use of conductive fillers, such as for example graphite, carbon black and/or metal powder.

The process sequence involved in the novel insulation of electrical conductors in accordance with the invention will now be described below on the basis of the fundamental explanations of the materials and of the device which have been presented above.

The process comprises the following steps:

1) Mounting the Coil or Bar which is to be Coated on a Rotation Device

In a first step S1, a bar or coil which is to be coated is mounted on a rotation device. In this case, the bar ends or coil eyelets are the holding points. The bar or coil is advantageously prestrengthened by internal adhesive bonding of the conductors or by winding a tape around them, since this facilitates handling, but this is not an imperative condition. In the case of relatively large objects, intermediate supports are useful in order to ensure reliable securing on the rotation device and accurate positioning. The rotation device with the coil or bar mounted on it is actuated by means of a control device, which is advantageously included in the control unit of a spray device.

2) Heating of the Bar or Coil

In the second step S2, the bar or coil is connected to electrical heating. This electrical heating may, for example, be resistance heating produced by direct current or low frequency, e.g. 50 Hz, or inductive heating by means of medium frequency or high frequency. This heating is used to heat the bar or coil to a desired substrate temperature.

3) Orienting the Bar or Coil Position with Respect to the Spray Gun

In the following third step S3, the bar or coil position is oriented in order for the spraying to start. During this step, one of the flat sides of the bar or coil is oriented perpendicular to the spray gun.

4) Spraying an Internal Corona-Discharge Protection onto the Bar or Coil

There then follows, as the fourth step S4 and therefore the first actual coating step, spraying of an internal corona-discharge protection in horizontal paths. The movement of the spray gun takes place in such a manner that a homogeneous layer thickness profile is produced. For this purpose, it may be necessary, in the case of very wide bars, to spray a plurality of overlapping paths in parallel. In this case, a conductive or semiconducting thermoset is used as the coating powder which is sprayed on. To accelerate the spraying, in the case of large objects it is possible to use a plurality of spray guns at the same time. The intermediate supports used to stabilize the position of relatively large objects move away automatically when the spray gun approaches, in order to allow complete coating of the bar or coil. It is easy to vary the layer thickness applied to the bar or coil by means of the quantity of coating powder which is delivered and the rate of movement of the spray gun. The layer thickness is generally $\leq 0.2$ mm per pass, in order to ensure that the layer is in each case free from bubbles.

5) Rotation of the Bar or Coil and Repetition of Steps S3 and S4

As the following fifth step S5, after the coating of a flat side has ended, the bar or coil is rotated, so that a further, as yet uncoated bar or coil side faces the spray gun. Then, the third and fourth steps S3 and S4 are repeated in order to coat the next side of the bar or coil. In the same way, the fifth, third and fourth steps S3, S4 and S5 are repeated again for all further sides of the bar or coil, until the bar or coil has been completely coated. Moreover, in the case of coils the steps are repeated for the other limb of the coil.

In general, the thickness required for the internal corona-discharge protection is applied in a single pass; in exceptional cases, however, it is also possible to carry out a plurality of coating passes, if a layer thickness of greater than 0.2 mm is desired.

6) Curing of the Internal Corona-Discharge Protection

Then, as step 6, this internal corona-discharge protective layer is cured partially or completely, i.e. for a time of between 2 and 10 min or 20 and 60 min at 200° C.

7) Application of the Insulating Layer in Accordance with Steps S3 to S6

Then, in a seventh step S7, the actual insulating layer is applied. In this case, a different coating powder from the internal corona-discharge protection is used, specifically an insulant-filled or unfilled thermoset.

Once again, the third, fourth and fifth steps described above, are carried out only with the insulating coating powder, with layers of <0.2 mm being applied repeatedly until a desired insulation thickness is reached. In this case, after each layer has been sprayed on, intermediate curing, which lasts from 2 to 10 times the gel time of the powder, is carried out. In addition, to ensure that the coating powder is melted on reliably, it is necessary to take account of the fact that the substrate temperature may have to be readjusted as the layer thickness increases. This is preferably carried out without contact, for example by means of an IR pyrometer. To prevent the conductor elements and their insulation from being overheated, it is possible to monitor the temperature-dependent resistance of the conductor.

8) Application of the External Corona-Discharge Protection in Accordance with Steps S3, S4, S5 and S6

As the next step, which follows the application of the insulating layer (step S7), an external corona-discharge protection comprising conductive epoxy is applied to the insulating layer. The material used and the process steps correspond to those described in the third, fourth and fifth steps.

9) Post-Curing of the Insulation Applied

The final step after the coating operations (steps S1 to S8) have ended is either post-curing of the insulation which has been applied using current heating on the holding device or in the furnace after removal from the rotation device.

Since, in this insulation process according to the invention, the bars are held at their ends, these ends are not coated. However, this does not have any disadvantages, since the bar ends in any case remain clear in order for circular connectors to be soldered on.

In the case of coils, on the other hand, the region of the coil eyelet is intentionally not coated. This is because this ensures the deformability of the coils which is required for installation. The coil eyelets are in this case only insulated in the installed state after installation.

The following processes are recommended for this operation of insulating the coil eyelets:

1) Either the motor stator is positioned vertically and the coils are heated electrically. In this case, the coil eyelets of the lower coil end are coated with thermoset powder as a result of the coil ends being immersed in a fluidized-bed sintering tank. In this case, the stator is rotated through 180° and the coil eyelets of the other stator end are coated in the same way as that described above. This process is suitable in particular for coating relatively small stators.

2) Alternatively, the motor winding is heated resistively and the end parts of the coils are insulated by spray-sintering. This process is advantageously used for relatively large motors, in which the total weight of the stator is high and vertical mounting may cause problems. Also, in the case of large machines the distances between the coils are generally greater, and consequently coating with a spray gun becomes easier.

In an alternative embodiment of the process according to the invention, it is possible to dispense with the step of spraying on an internal corona-discharge protection as described in the above steps 3) to 5) if a tape, which is provided with a conductive or semiconducting layer and therefore forms an internal corona-discharge protection at the time of the prestrengthening, is used for the prestrengthening of the coil or bar.

To summarize, the invention discloses a process for producing a high-quality insulation for conductors or conductor bundles of electrical machines by means of spray-sintering. Unlike in the prior art, it is possible to apply internal corona-discharge protection, insulation and external corona-discharge protection to conductors or conductor bundles in which, on account of the absence of defects, no partial discharges occur, without the need for complex special equipment which is required for the insulation with mica which has previously been employed.

Therefore, the invention provides a simple, inexpensive process for insulating conductor bars or coils with a high-quality insulation which is free of defects and therefore free of partial discharges.

To summarize, the present invention discloses a process for producing a high-quality insulation for conductors or conductor bundles of electrical machines by means of spray-sintering. Unlike in the prior art, it is possible to apply internal corona-discharge protection, insulation and external corona-discharge protection to conductors or conductor bundles in which, on account of the very low level of defects in the insulation and the inherent resistance thereof to partial discharges, it is possible to dispense with the use of winding processes using glass/mica tapes. This eliminates the use of complex special equipment and the throughput times can be shortened considerably.

What is claimed is:

1. A process for producing an insulation for conductors or conductor bundles, the method comprising:
   (S1) mounting a conductor or conductor bundle which is to be coated on a rotation and holding device, the conductor or conductor bundle including flat sides;
   (S2) heating the conductor or conductor bundle to a predetermined substrate temperature;
   (S3) orienting the conductor or conductor bundle position with respect to a spray device so that one of the flat sides faces the spray device;
   (S4) spraying an internal corona-discharge protection layer onto the conductor or conductor bundle with the spray device;
   (S5) rotating the conductor or conductor bundle so that another flat side faces the spray device, and repeating steps S3 to S4 until all the flat sides of the conductor or conductor bundle have been coated;
   (S6) partially or completely curing the internal corona-discharge protection which has been applied;
   (S7) applying an insulating layer in accordance with steps S3 to S6 to all sides of the conductor or conductor bundle, with layer thicknesses of less than 0.2 mm, and curing after applying each layer;
   (S8) applying an external corona-discharge protection layer in accordance with steps S3 to S6; and
   (S9) curing the layers which have been applied.

2. The process as claimed in claimed in claim 1, wherein the conductor or conductor bundle comprises a transposed bar or a coil.

3. The process as claimed in claim 1, further comprising:
   (S0) prestrengthening the conductor or conductor bundle by internal adhesive bonding or by winding a tape around the conductor or conductor bundle.

4. The process as claimed in claim 2, wherein the conductor or conductor bundle comprises a bar having bar ends or a coil having coil eyelets, and wherein step S1 comprises holding the bar at the bar ends or the coil at the coil eyelets.

5. The process as claimed in claim 1, wherein step S1 mounting comprises holding using additional intermediate supports in order to ensure accurate positioning.

6. The process as claimed in claim 1, wherein step S2 heating comprises heating the conductor or the conductor bundle by resistance heating using direct or low frequency current, or by medium frequency or high frequency inductive heating.

7. The process as claimed in claim 1, wherein step S2 heating the conductor or conductor bundle is performed either before or after step S1 mounting on the rotation and holding device, wherein heating comprises heating by irradiation, and optionally further comprising additional heating when the substrate temperature drops below a predetermined substrate temperature.

8. The process as claimed in claim 1, in which steps S4, S7 and S8, for a wide conductor or conductor bundle, comprise spraying in a plurality of parallel paths using a plurality of spray devices.

9. The process as claimed in claim 1, wherein step S4 spraying comprises spraying a conductively or semiconductively filled, thermally crosslinking plastic coating powder.

10. The process as claimed in claim 5, wherein step S4 spraying comprises moving the intermediate supports away when the spray device approaches.

11. The process as claimed in claim 1, further comprising:
varying a layer thickness by controlling a delivery quantity of a coating powder and a rate of movement of the spray device.

12. The process as claimed in claim 2, wherein the conductor or conductor bundle comprises a coil, and step S5 repeating comprises repeating for another side of the coil.

13. The process as claimed in claim 1, wherein step S7 applying an insulating layer comprises applying an insulant-filled, thermally crosslinking plastic coating powder.

14. The process as claimed in claim 1, wherein step S8 applying an external corona-discharge protection layer comprises applying a conductive, thermally crosslinking plastic coating powder.

15. The process as claimed in claim 1, wherein step S9 curing comprises:
curing with current heating, subsequently cooling the conductor or conductor bundle, and removing the conductor or conductor bundle from the rotation device; or
immediately removing the conductor or conductor bundle from the rotation device, and curing in a furnace.

16. The process as claimed in claim 1, wherein step S4 spraying comprises charging a coating material before spraying on the conductor or conductor bundle surface, said charging comprising electrostatic or triboelectric charging.

17. The process as claimed in claim 1, wherein steps S3 to S8 are performed to apply different layer thicknesses different conductor or conductor bundle sides.

18. The process as claimed in claim 2,
wherein the conductor or conductor bundle comprises a coil having coil sides and coil eyelets, and further comprising (S10) after installation of the coil, positioning a motor stator vertically, electrically heating the coil, and immersing the coil eyelets in a fluidized bed sintering tank for coating with epoxy, for both coil sides; or
wherein the conductor or conductor bundle comprises a bar having bar ends, and further comprising (S10) resistively heating a motor winding and insulating the bar ends by spray-sintering.

19. The process as claimed in claim 1, wherein step S7 further comprises:
monitoring the surface temperature without contact; and
adjusting the substrate temperature when the surface temperature deviates from a predetermined surface temperature.

20. The process as claimed in claim 9, wherein the thermally crosslinking plastic comprises an epoxy resin in the B state.

21. The process as claimed in claim 1, wherein the spray device comprises a an adjustable displacement unit and a spray gun arranged on the adjustable displacement unit, and further comprising:
moving the spray gun with the displacement unit and moving the conductor or conductor bundle with the rotation and holding device, or
moving only the spray gun with the displacement unit.

22. The process as claimed in claim 13, wherein the thermally crosslinking plastic comprises an epoxy resin in the B state.

23. The process as claimed in claim 14, wherein the thermally crosslinking plastic comprises an epoxy resin in the B state.

24. A process for producing an insulation for conductors or conductor bundles, the method comprising:
(S0) winding a tape around the conductor or conductor bundle, the tape including a conductive or semiconductive layer and forming an internal corona-discharge protection layer, the tape prestrengthening the conductor or conductor bundle:
(S1) mounting a conductor or conductor bundle which is to be coated on a rotation and holding device, the conductor or conductor bundle including flat sides;
(S2) heating the conductor or conductor bundle to a predetermined substrate temperature;
(S7) applying an insulating layer to all sides of the conductor or conductor bundle, with layer thicknesses of less than 0.2 mm, and curing after applying each layer, said applying performed according to steps (S7.1) to (S7.4) as follows:
(S7.1) orienting the conductor or conductor bundle position with respect to a spray device so that one of the flat sides faces the spray device;
(S7.2) spraying a layer onto the conductor or conductor bundle with the spray device;
(S7.3) rotating the conductor or conductor bundle so that another flat side faces the spray device, and repeating steps S7.1 to S7.2 until all the flat sides of the conductor or conductor bundle have been coated; and
(S7.4) partially or completely curing the layer which has been applied;
(S8) applying an external corona-discharge protection layer in accordance with steps S7.1 to S7.4; and
(S9) curing the layers which have been applied.

* * * * *